US006643912B1

(12) United States Patent
Behrens et al.

(10) Patent No.: US 6,643,912 B1

(45) Date of Patent: Nov. 11, 2003

(54) METHOD OF PRODUCING A COMMUTATOR OF AN ELECTRICAL MACHINE

(75) Inventors: Friedrich Behrens, Diekholzen (DE); Hans Deierling, Hildesheim (DE); Stefan Ossenkopp, Hildesheim (DE); Martin Schwerdtle, Schwieberdingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/509,396

(22) PCT Filed: Apr. 3, 1998

(86) PCT No.: PCT/DE98/00941

§ 371 (c)(1), (2), (4) Date: Jun. 25, 2001

(87) PCT Pub. No.: WO99/17409

PCT Pub. Date: Apr. 8, 1999

(65) Prior Publication Data

(65)

(30) Foreign Application Priority Data

Sep. 30, 1997 (DE) ........................................ 197 43 086

(51) Int. Cl.$^{7}$ ......................... H01R 43/06; H02K 15/00

(52) U.S. Cl. ............................. 29/597; 29/596; 29/598; 315/233

(58) Field of Search .......................... 29/596, 597, 598; 310/233, 235, 236, 237

(56) References Cited

U.S. PATENT DOCUMENTS

| | | | | |
|---|---|---|---|---|
| 4,358,319 A | * | 11/1982 | Yoshida et al. | 419/5 |
| 5,204,574 A | * | 4/1993 | Kanno et al. | 310/233 |
| 5,584,115 A | * | 12/1996 | Takahashi | 29/597 |

FOREIGN PATENT DOCUMENTS

| | | | | |
|---|---|---|---|---|
| DE | 12 18 053 B | | 6/1966 | |
| DE | 195 43 998 A | | 5/1997 | |
| EP | 0 019 472 A | | 11/1980 | |
| GB | 899393 | * | 3/1961 | |
| GB | 2 307 599 | * | 5/1997 | H01R/39/06 |

* cited by examiner

*Primary Examiner*—Carl J. Arbes
*Assistant Examiner*—Thiem Dinh Phan
(74) *Attorney, Agent, or Firm*—Michael J. Striker

(57) ABSTRACT

The invention relates to a method for producing a commutator ring (10) for a commutator of an electrical machine, in which the laminas (12) of the commutator ring and fastening means (18) are formed out of a band material (27), and a selectable number of laminas (12) are then closed to form the commutator ring. The fastening means are produced with a special tool (35) in the form of dovetail grooves (22) by means of a so-called furrowing operation, which is done simultaneously from both face ends of the laminas (12).

6 Claims, 5 Drawing Sheets

METHOD OF PRODUCING A COMMUTATOR OF AN ELECTRICAL MACHINE

BACKGROUND OF THE INVENTION

The invention is based on a method for producing a commutator ring for a commutator. It is known to produce commutator rings from a previously engraved band material for so-called roll commutators. In this process, an optionally profiled endless band, whose width is equivalent to the later axial length of the commutator, is provided transversely to the direction of motion of the band with grooves by means of a forming tool, so that laminas that are now joined together only via webs. Depending on the number of laminas in a commutator ring, a corresponding number of laminas is cut apart from the onward-moving, now shaped band and closed to form the commutator ring. To stabilize the commutator ring and to insulate the individual laminas from one another, the commutator ring is usually embedded together with a metal hub in an insulating compound.

In order to prevent axial and radial shifting of the laminas in the later intended use of the commutator ring, it is known—for instance from German Published, Examined Patent Application DE-AS 12 18 053—to cut barbs on the back side of the laminas for the sake of anchoring them in the insulating compound. This has the disadvantage that cutting the barbs reduces the usable thickness of the laminas of the commutator ring.

From U.S. Pat. No. 5,204,574, a commutator ring is also known which has dovetail profiles extending axially of the laminas, by means of which profiles securing of the laminas in the radial direction of the commutator is assured, but shifting in the axial direction of the commutator cannot be precluded.

To overcome this disadvantage, it is known from Published, Unexamined German Patent Application DE-OS 195 43 998, for the sake of axially securing the laminas, to design the dovetail profiles by means of a special process in such a way that via the axial spacing, an interruption of the dovetail profile is made. This production process is still relatively complex, however, making it more expensive.

SUMMARY OF THE INVENTION

In accordance with the present invention, dovetail grooves provided on the laminas are formed by simultaneous lateral furrowing of the laminas beginning at both face ends of the laminas by means of one tool each so that approximately in the middle of the laminas, a groove-free zone remains between the dovetail grooves.

The method of the invention for producing a commutator ring has the advantage over the prior art that its production is made still simpler and less expensive, and that even very special forms of the dovetail groove can be produced more simply, for the sake of especially good retention of the laminas.

Further advantages of the invention will become apparent from the ensuing description, the dependent claims, and the drawing.

BRIEF DESCRIPTION OF THE DRAWING

The invention will be described in further detail below in terms of two exemplary embodiments in conjunction with the drawings.

DESCRIPTION OF THE PREFERRED EMBODIMENTS

Figure 1:
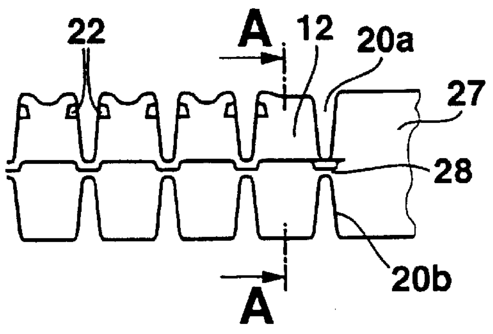
FIG. 1 is an elevation view of the face end of a profiled lamina band with furrowed dovetail grooves.
Figure 2:
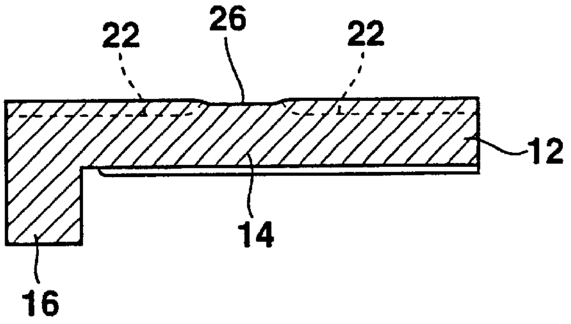
FIG. 2 is a cross section through the profile of the laminas in the direction A—A of FIG. 1.
Figure 3:
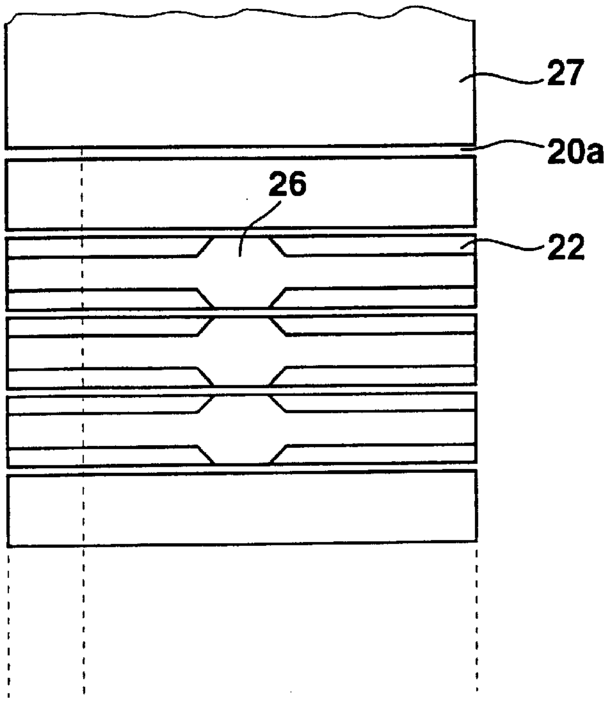
FIG. 3 is an elevation view from the back side of the lamina profile band of FIG. 1.

In FIGS. 1–3, a lamina profile band is shown in fragmentary form as a lamina strand 27, which has an L-shaped copper profile. In the engraving apparatus described in further detail hereinafter and shown in FIGS. 4–6, the lamina strand is machined in individual production steps. In a first step, by means of contrary dies, engraved grooves 20*a*, 20*b* are engraved in the lamina strand in a known manner, thus cutting the laminas 12 of a commutator apart from the strand. What remains between the laminas 12 is a connecting web 28. In subsequent operating increments, dovetail grooves 22 are then made on the long sides of the laminas 12; they serve the purpose of later anchoring of the laminas in the insulating material of the commutator.

The laminas 12 have a long leg 14, whose outside later forms the running face of the commutator. A short, radially outward-pointing leg 16 serves to make contact of the laminas 12 with the winding terminals of the rotor of an electrical machine, not shown. The dovetail grooves 22 extend longitudinally of the back side of the laminas, or in other words axially of the commutator, and are interrupted approximately in their middle. What remains approximately in the middle of the laminas between the dovetail grooves 22 is a groove-free zone 26.

Figure 4:
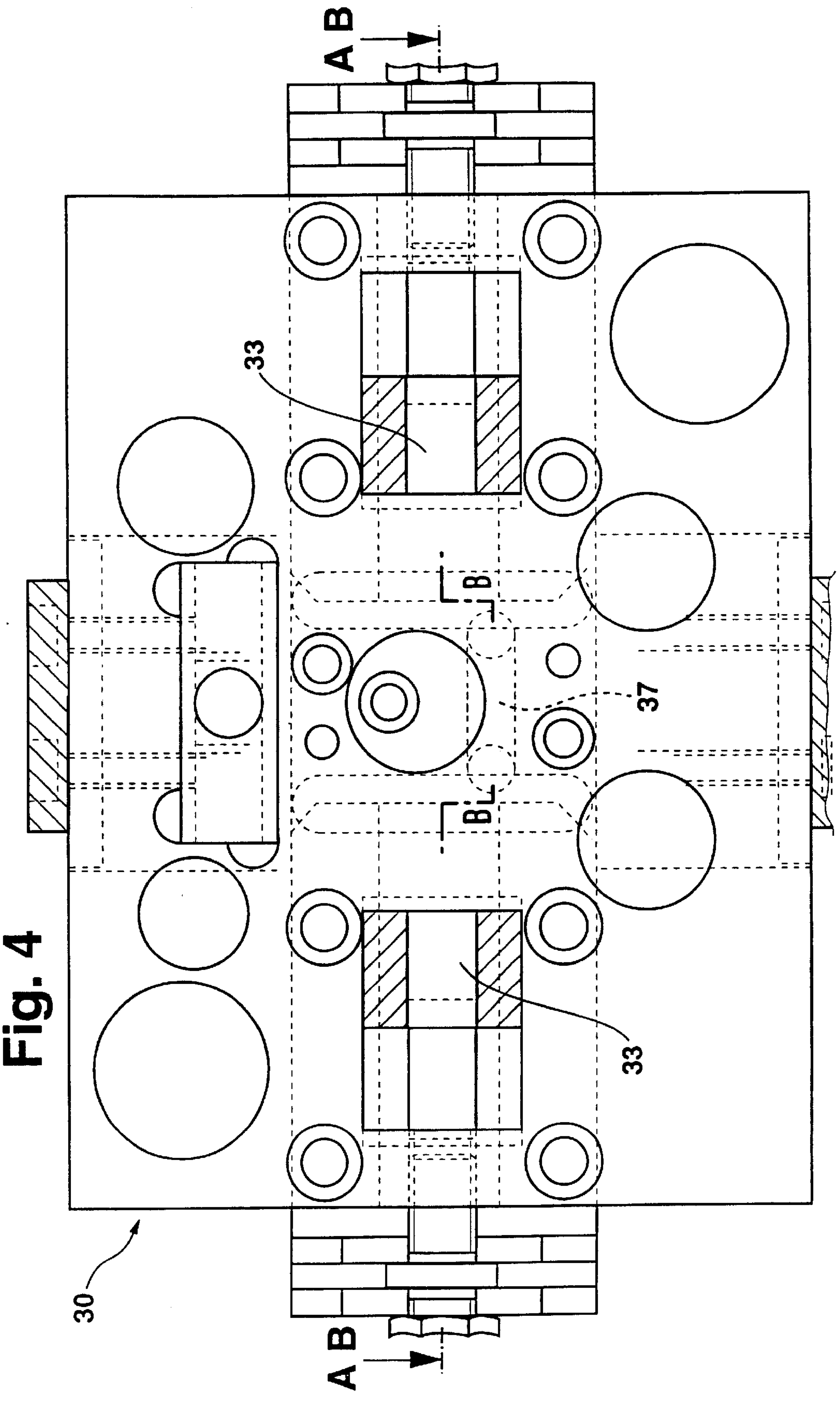
FIG. 4 is a plan view of an apparatus for producing the lamina profile band.
Figure 5:
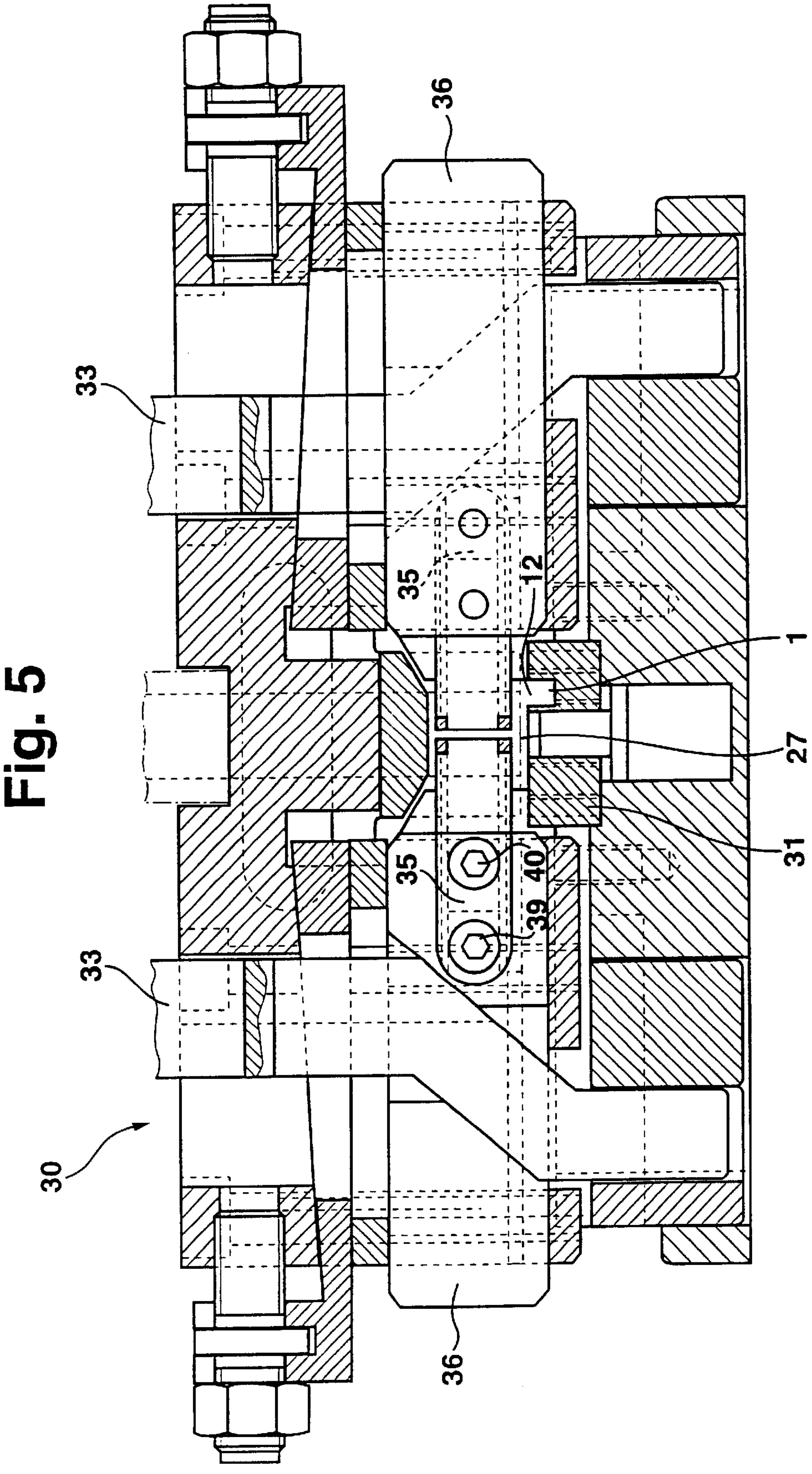
FIG. 5 is a cross section along the line A—A of FIG. 4.
Figure 6:
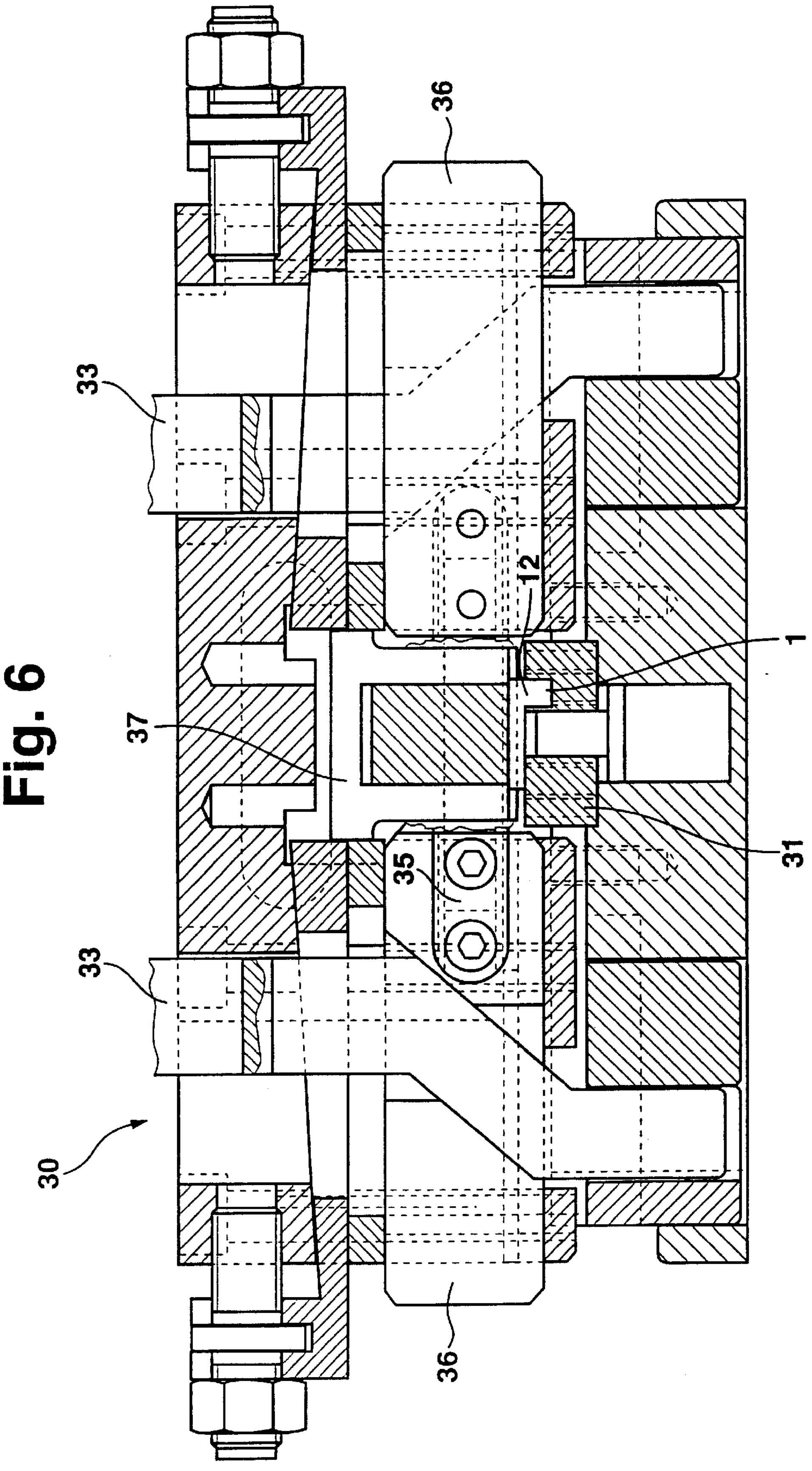
FIG. 6 is a cross section along the line B—B of FIG. 4.
Figure 7:
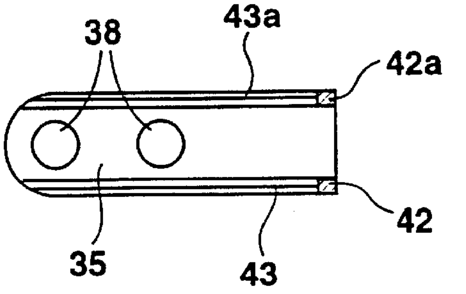
FIG. 7 is a side view of a special tool for the apparatus of FIGS. 4–6 for furrowing the laminas.
Figure 8:
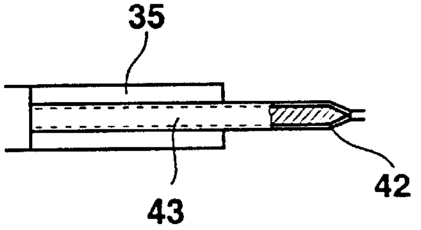
FIG. 8 shows the special tool in plan view.

FIGS. 4–6 show an apparatus 30 for producing a lamina strand according to FIGS. 1–3. In FIG. 5, in a longitudinal section through the apparatus 30, the lamina strand 27 can be seen lying on its back on a support 31, specifically with its short leg 19 downward. A feed device transports the lamina strand 27 toward the observer, and an embossed groove 20*a* is first engraved in each lamina 12 by an engraving tool, not visible here. Then by means of two toggle levers 33 that move vertically upward and downward and with the aid of one special tool each, the so-called furrowing tool 35, as shown in FIGS. 7–10, one profiled dovetail groove 22 is furrowed into each long side of the laminas 12 simultaneously from both face ends of the laminas, or in other words from the right and left, in each case as far as the groove-free zone 26 of each lamina (see FIGS. 1–3). The direction of motion of the tool 35 is horizontal. This involves a reciprocating motion by means of a toggle lever guide 36. After each furrowing operating on the opposed sides of the adjacent laminas 12, the lamina strand 27 is moved onward by one lamina 12. During the furrowing operation, the laminas 12 are pressed against the support 31 of the apparatus 30 by means of a down-holding device 37 that can be seen in FIG. 6. In FIG. 5, it can be seen that the furrowing tools 35 have dipped from the face ends of the laminas 12 into a longitudinal groove 22a between laminas far enough that between the opposed furrowing tools 35, the requisite spacing for creating the groove-free zone 26 still remains.

Figure 9:
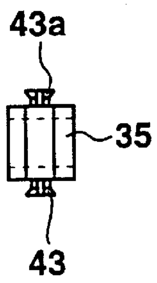
FIG. 9 shows this tool in a front elevation view.
Figure 10:
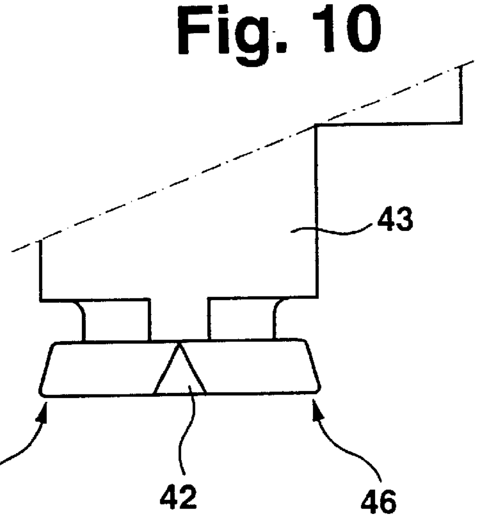
FIG. 10 shows this tool in an enlarged detail of the face end of the furrowing knife.
Figure 12:
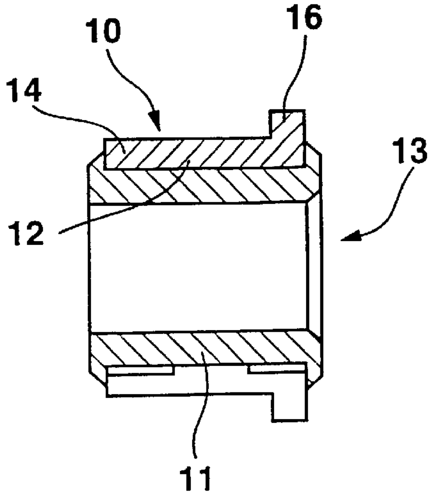
FIG. 12 shows a finished commutator in longitudinal section.

The furrowing tool 35 can be seen in FIGS. 7–10. FIG. 5 shows the side view with its fastening holes 38, with the aid of which it is fastened firmly in the apparatus 30 by screws 39, 40 shown in FIG. 5. The furrowing tool 35 has a double-edged furrowing knife 43, 43*a* at the top and at the bottom, and the knife terminates at the front in a respective furrowing point 42, 42*a*. In the plan view of FIG. 8, the point 42 of the furrowing tool 35 is seen. In FIG. 9, the front elevation view of the furrowing tool 35 is shown, and FIG. 10 shows the lower portion of FIG. 9, substantially enlarged. It can be seen there that there is one furrowing edge 45, 46 on each of the two sides of the furrowing knife 43. With the aid of the furrowing knife 43 and the furrowing point 42, the furrowing of the profiled dovetail grooves 22 is thus done simultaneously on both long sides of the embossed grooves 20*a* of the laminas 12 from both face ends as far as the middle remaining zone 26, which remains free of dovetail grooves. Particularly from FIG. 10, it is clearly seen that as a result of the furrowing edges 45 and 46 of the lower furrowing knife 43, one furrow each is made in the opposed long sides of the adjacent laminas 12. As soon as the lower furrowing knives 43 have reached their serviceable lives, the furrowing tool 35 is removed from the apparatus 30 and rotated 180 about the longitudinal axis, so that the upper furrowing knife 43*a* can now be used.

Figure 11:
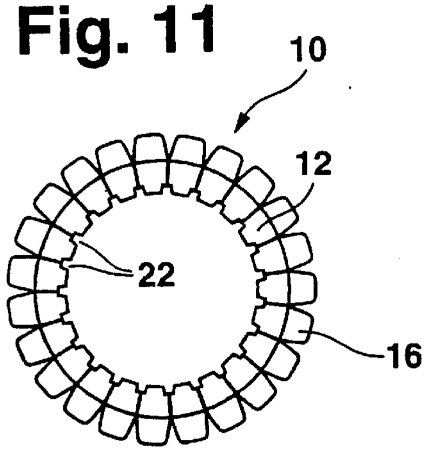
FIG. 11 is a plan view on the face end of a lamina ring rolled into its finished form.

Once the requisite number of laminas in the lamina strand 27 of FIG. 1 is attained in succession in this way, this strand is cut from the profile band by the apparatus 30, 15 and in the next station, a lamina ring 10, as shown in FIG. 11, is formed from the lamina strand 27 in a known manner.

This ring comprises a plurality of annularly disposed laminas 12, which seen in longitudinal section have an L-shaped profile. The laminas are then embedded with their dovetail grooves 22 for anchoring purposes in an insulating molding composition 11, which can optionally also receive a metal hub at its hub bore 13. After the lamina ring has been embedded, the connecting webs 28 between the laminas are twisted off in a the region of the running face of the collector, so that the laminas are now anchored in the collector hub in such a way that they are insulated from one another.

Figure 13:
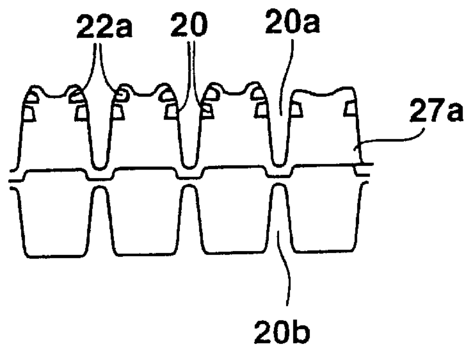
FIG. 13, as a further exemplary embodiment, shows a lamina profile band with double dovetail grooves.

FIG. 13 shows a second exemplary embodiment of the invention, namely a lamina strand 27*a* with double dovetail grooves 22 and 22*a*. Once again, after the engraving of the longitudinal grooves 20*a* and 20*b*, the dovetail groove 22 is first furrowed into the lamina sides—as described above.

This is done in a first station of the apparatus 30. In a succeeding station of the same apparatus, the upper dovetail grooves 22*a* are then furrowed into the sides of the laminas with a similar knife, as shown and described in FIGS. 7–10.

Depending on the design of the furrowing knife profile, various forms of embodiment are possible. With such double furrows, the anchoring of the laminas 12 in the insulating material of the commutator hub is strengthened further, so that with such laminas, higher rotary speeds and larger commutator diameters can be achieved. Optimization with regard to the tear strength of the insulating material on the one hand and the lamina material on the other is expediently achieved by providing that the last furrows 22*a* made are embodied as relatively long.

What is claimed is:

1. A method of producing a commutator of an electrical machine, comprising the steps of forming a commutator ring which has laminas; disposing the laminas side by side over a circumference of the commutator ring and shaping the laminas from a band material by engraved grooves; anchoring the laminas in an insulator body by dovetail grooves provided on inner sides and extending axially of the laminas so as to act as fastening means; and forming the dovetail grooves by simultaneous lateral furrowing of the laminas parallel to surfaces of the laminas, beginning at both face ends of the laminas by means of one tool each, so that approximately in a middle of the laminas, a groove-free zone remains between the dovetail grooves.

2. A method as defined in claim 1, and further comprising using the tools for furrowing which are formed as knives; and moving the knives back and forth in opposite motion along sides of the laminas.

3. A method as defined in claim 1, and further comprising forming the dovetail grooves by furrowing out with a further tool, in form of double dovetail grooves located one above the other on the sides of the laminas.

4. A method as defined in claim 1, and further comprising using for the furrowing of the laminas an apparatus in which a strand of the laminas is placed in such a way that long legs of the laminas are oriented with their face ends toward the tool; and performing engraving of the engraved grooves between the laminas beforehand in the same apparatus.

5. A method as defined in claim 1, and further comprising furrowing out lower grooves of the dovetail grooves in a first station on an apparatus; and furrowing out upper grooves of the dovetail grooves in a subsequent station in sides of the laminas. grooves.

6. A method of producing a commutator of an electrical machine, comprising the steps of forming a commutator ring which has laminas; disposing the laminas side by side over a circumference of the commutator ring and shaping the laminas from a band material by engraved grooves; anchoring the laminas in an insulator body by dovetail grooves provided on inner sides and extending axially of the laminas so as to act as fastening means; and forming the dovetail grooves by simultaneous lateral furrowing of the laminas parallel to surfaces of the laminas, beginning at both face ends of the laminas by means of one tool each, so that approximately in a middle of the laminas, a groove-free zone remains between the dovetail grooves; and performing the farrowing simultaneously in two laminas located side-by-side on opposed sides of the laminas.

* * * * *